Nov. 12, 1968     H. G. SPIER     3,409,967
BEARING ALIGNMENT APPARATUS AND METHOD
Filed May 5, 1966

INVENTOR.
HANS G. SPIER
BY Seidel & Gonda

ATTORNEYS.

United States Patent Office 3,409,967
Patented Nov. 12, 1968

3,409,967
BEARING ALIGNMENT APPARATUS
AND METHOD
Hans G. Spier, Media, Pa., assignor to Baldwin-Lima-Hamilton Corporation, Philadelphia, Pa., a corporation of Delaware
Filed May 5, 1966, Ser. No. 547,971
9 Claims. (Cl. 29—149.5)

ABSTRACT OF THE DISCLOSURE

A bearing unit comprising inner and outer bearing races which define a double wedge-shape cavity therebetween. The cavity is filled with steel balls or shot which are movable within the cavity. The shaft is aligned with the inner bearing race and is inserted therethrough. The shaft and bearing unit are assembled in a loose and yieldable engagement. The shaft is vibrated, wrapped, etc., so that the bearing and shaft are fully aligned. This results in a self-arrangement of the metal shot in the cavity. After the bearing and shaft are thus aligned, a liquid high strength material is introduced into the space between the shot in order to lock the shot from shifting and yet permit metal contact throughout the connecting layer of shot. The liquid material may be plastic or metal.

---

This invention relates to a bearing alignment apparatus and method and, more particularly, to a bearing alignment apparatus and method which can be utilized to obviate the necessity for expensive precision machining operations.

The aligning of a bearing concentric with a shaft so that no parallel and/or angular misalignment occurs is a difficult and time-consuming operation. The difficulties are increased wherein multiple bearings are used to support a single shaft. In the past, spherical bearing shell supports have been used to avoid angular misalignment between the shaft and the bearing, but parallel misalignment between the axes of the shaft and the bearing has remained a problem difficult of solution. Where angular and parallel misalignment are encountered, the universally adjustable arrangement of the bearing shell support with respect to the shaft axis is required.

A further problem is encountered when hard shaft and bearing materials are used. Such hard materials include the use of carbide. It is desirable to use carbide on pump shafts and bearings in order to prevent wear due to erosion and corrosion as a result of the chemical and/or contaminative condition of the liquid which is to be pumped, and this is particularly true where such pumped liquid normally contacts or lubricates the bearing. Since hard bearings, such as carbide bearings, cannot compensate for slight misalignment by "wearing-in," the initial alignment accuracy must be very precise.

It is an object of the present invention to provide a bearing alignment apparatus and method which obviates the deficiencies present in prior art bearing assemblies.

It is another object of this invention to provide a bearing alignment apparatus and method by means of which an accurate line-up between a shaft and a bearing can be obtained without the necessity of costly high precision machining operations on the bearing.

It is a further object of the present invention to provide a bearing alignment apparatus and method which is vastly superior to that known in the prior art and obviates the expense encountered in prior art bearing alignment apparatus and methods.

It is still another object of the present invention to provide a bearing alignment apparatus and method for bearings made of hard materials such as carbide wherein no misalignments between the shaft axis and the bearing axis are encountered and no "wearing-in" of the bearing is necessary.

It is yet another object of the present invention to provide a bearing alignment apparatus and method which utilizes metal balls or "shot" for obtaining an accurate alignment between a shaft and a bearing.

Other objects will appear hereinafter.

The above-enumerated and other objects are accomplished by means of the present invention. The present invention contemplates the use of a bearing unit comprising inner and outer bearing races which define a double wedge-shaped cavity therebetween. The cavity is filled with steel balls or shot which are moveable within the cavity. The shaft is aligned with the inner bearing race and is inserted therethrough. The shaft and bearing unit are assembled in a loose and yieldable arrangement. Thereafter, the shaft is vibrated, turned, rapped, or otherwise moved into position wherein the bearing and the shaft are fully aligned. This results in a self arrangement of the flowable metal shot in the double wedge-shaped cavity. After the bearings and the shaft are thus aligned, a liquid high strength material such as a polymeric plastic is introduced into the space between the shot in order to lock the shot from shifting and yet maintain metal contact throughout the connecting layer of shot. Other suitable materials which can be used instead of a plastic include liquid metal having a suitable melting point and eutectic characteristics. During the alignment of the bearing unit with the shaft, suitable shims may be utilized to insure the proper design clearance between the shaft and the bearing unit. If manual removal of the shims is not possible or practical, shims made from chemically or thermally removable material may be used.

For the purpose of illustrating the invention, there is shown in the drawings a form which is presently preferred; it being understood, however, that this invention is not limited to the precise arrangements and instrumentalities shown.

Figure 1:
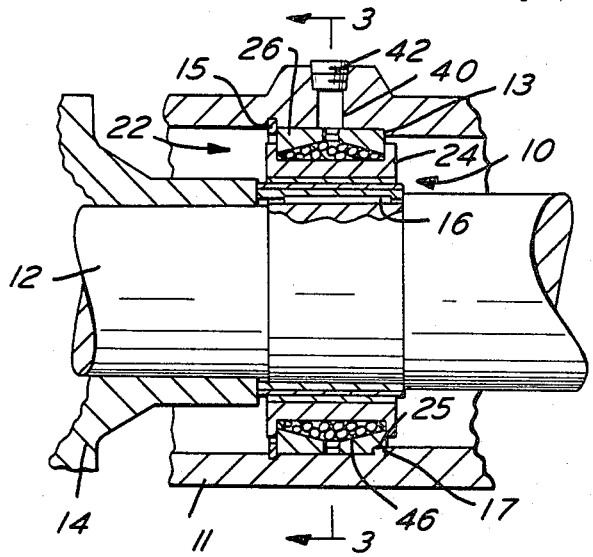
FIGURE 1 is a partial section view of the apparatus of the present invention showing the bearing assembly and the shaft in aligned position.
Figure 2:
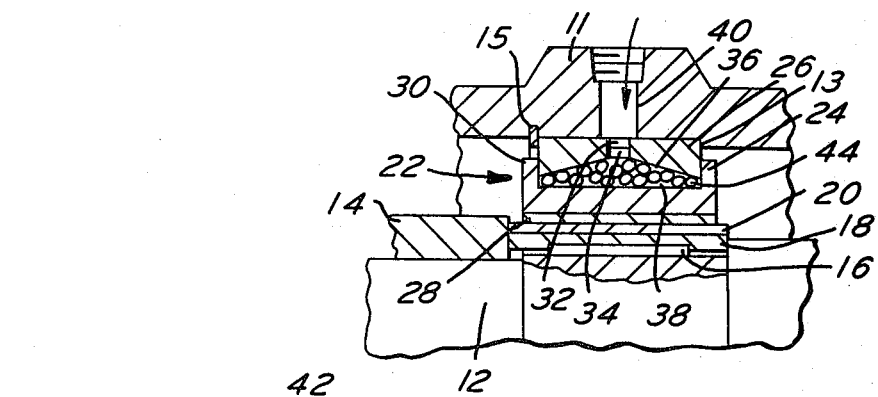
FIGURE 2 is an enlarged section view of a portion of the structure shown in FIGURE 1.
Figure 3:
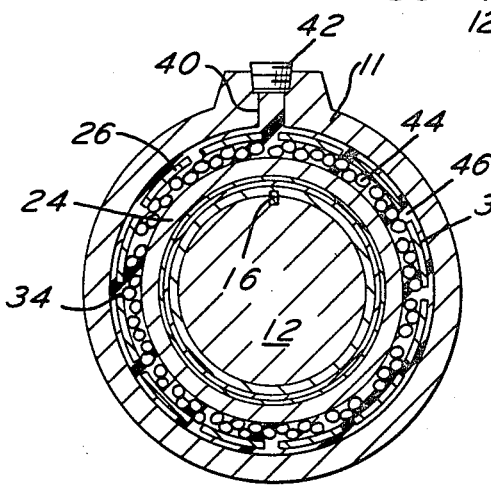
FIGURE 3 is a section view taken along line 3—3 of FIGURE 1.

Referring to the drawings in detail, wherein like numerals indicate like elements, there is shown in FIGURE 1 a bearing assembly designated generally as 10. A housing 11 encompasses the bearing assembly 10.

The bearing assembly 10 includes a shaft 12. The shaft 12 has a key 16 connected thereto. The key 16 connects the sleeve 18 to the shaft 12. The sleeve 18 is provided with a layer of material 20 which may be connected thereto in any convenient manner on its outermost surface. Material 20 may be a hard metal such as carbide. The shaft 12 may be connected to a pump impeller 14, by means of a key or other conventional connecting means, or other suitable mechanism to be rotated.

A bearing unit 22 is mounted within the casing 11. A shoulder 13 is provided in the casing 11 and the bearing unit abuts the shouder. A retaining ring 15 or other suitable means may be attached to the casing 11 so that lateral shifting of the bearing unit 22 is prevented. The bearing unit 22 includes an inner bearing race 24 and an outer bearing race 26. The bearing unit 22 may be assembled in any convenient manner such as by providing an axial split in the outer bearing race 26. Other suitable assembly means could also be used. The inner bearing race 24 is provided with a layer 28 which may be connected thereto in any convenient manner which circumscribes the inner periphery thereof and which may be made of hard material such as carbide or the like. The inner bearing race 24 is provided with upstanding side portions 30 to insure proper positioning of the outer bearing race 26 with respect thereto.

The outer bearing race 26 may be keyed to the casing 11 by means of a key 17 which is connected to the casing 11 which cooperates with a groove 25 on the outer bearing race 26 in order to prevent rotation of the bearing unit 22 with the shaft 12. Under severe operating conditions rotation of the bearing unit 22 with the shaft 12 could result in a misalignment of the bearing unit 22 with respect to the shaft. Furthermore, the keying of the race 26 to the casing 11 prevents wedging rather than rolling of metal balls or shot 44 as will be made clear hereinafer.

A groove 32 circumscribes the outermost surface of the outer bearing race 26. Holes 34 are selectively spaced at intervals in the groove 32 in the outer bearing race 26.

The outer bearing race 26 is povided with tapered inner walls 36 which circumscribe the entire inner periphery of the outer surface of the inner bearing race 24 to define a double wedge-shaped cavity 38 therebetween.

A hole 40 is provided in the casing 11. The hole 40 is aligned with the groove 32 in the outer bearing race 26. A nozzle 42 is adapted to be connected to the hole 40 so that material may flow therethrough into the double wedge-shaped cavity 38.

Steel balls or shot 44 are retained in the cavity 38. Shims may be provided for maintaining the design clearance between the shaft and the bearing unit. The shaft and the bearing are then accurately aligned and the metal shot arranges itself within the double wedge cavity 38. The tapered walls 36 of the double wedge cavity 38 facilitate the positioning of the shot 44 in the cavity. The distance between the inner race 24 and the outer race 26 is in all places the equal to or greater than the diameter of the shot which is used. At the center of the cavity 38 the distance between the inner and outer races may be many times greater than the diameter of the metal shot 44. For example the distance across the center of cavity 38 in a radial direction may be half inch while shot 44 may have a diameter of between .06–.125 inch. The distance between the races 24 and 26 increases from the sides of the bearing unit towards the center thereof in accordance with the sharpness of the taper of the inner walls 36 of the outer bearing race 26.

A flowable material 46 such as plastic is then introduced through the nozzle 42 into the cavity 38. A high strength liquified polymeric plastic is a preferable material. However, other suitable materials may also be used. The material 46 solidifies and prevents the shot from shifting and retains the bearing unit 22 in a fixed position with respect to the shaft 12. The tapered inner walls 36 cooperate with the shot 44 to firmly position the shot and prevent parallel and angular misalignment.

The alignment of the bearing and the shaft is accomplished in the following manner. The bearing unit 22 is positioned within the casing 11. The shaft 12 is aligned with the inner race 24 of the bearing unit 22. The metal shot 44 functions as a flowable medium between the races 24 and 26 and facilitates the alignment of the shaft and the bearing unit. The shaft and the bearing unit 22 are then assembled in a loose and yieldable arrangement. A self arranegment of the shot is then achieved by "working" the shaft by turning, rapping, or vibrating the shaft into its proper position wherein the bearing unit is fully aligned. It is to be understood that the term "working the shaft" includes turning, rapping, vibrating, or other similar suitable operations. During the "working" of the shaft, the design clearance between the shaft and bearings is maintained by use of suitable metal or plastic shims. If the manual removal of shims is not easily accomplished, shims made from chemically or thermally removable material may be used in place of the plastic or metal shims.

After the bearing unit 22 is in proper angular and parallel alignment with the shaft 12, a suitable flowable material 46 is injected into the double wedge cavity 38. The material 46 solidifies and locks the shot in place and prevents the shot from shifting while still maintaining metal contact throughout the connecting layer of shot. Suitable materials 46 include a liquid high strength plastic such as polypropylene, a liquid metal of suitable melting point and eutectic characteristics, or other suitable materials.

The tapered inner walls 36 of the outer bearing race 26 facilitate movement of the shot 44 when race 24 is moved relative to race 26 during the alignment operation. It is readily seen that by use of the method and apparatus of the present invention, both parallel as well as angular misalignment are prevented.

This invention may also be used for end thrust bearing alignments. It is also within the scope of this invention that the material 46 be premixed while in liquid form with the shot 44 and the mixture thereafter inserted into the double wedge cavity 38. However, in the preferred embodiment, the shot and material are inserted into the double wedge cavity 38 at separate times.

The present invention may be embodied in other specific forms without departing from the spirit or essential attributes thereof and, accordingly, reference should be made to the appended claims, rather than to the foregoing specification as indicating the scope of the invention.

I claim:

1. A method of aligning a bearing unit with a shaft comprising the steps of pre-positioning a two race bearing, inserting metal shot between the two races which comprise the bearing, aligning the shaft with the two race bearing, inserting the shaft through the two race bearing, and thereafter inserting material for locking the shot in place.

2. A method as set forth in claim 1 including the step of moving the inner race until it is properly aligned with respect to the shaft so that the shot self-positions itself between the two races of the bearing prior to the insertion of the material for locking the shot in place.

3. A method as set forth in claim 1 including the step of working the shaft to achieve a proper alignment between the two race bearing and the shaft prior to inserting the material for locking the shot in place.

4. A method of aligning a bearing unit with a shaft wherein the bearing unit comprises inner and outer bearing races, comprising the steps of: positioning a first flowable medium comprising shot between the inner and outer bearing races, aligning the shaft with said bearing unit, inserting the shaft through the inner bearing race, working the shaft so that the shot becomes properly positioned, inserting a solidifiable material between the inner and outer bearing races to lock the shot in place.

5. Apparatus for aligning a bearing unit with a shaft comprising a shaft, a bearing unit mounted on said shaft, said bearing unit including an inner bearing race and an outer bearing race, said outer bearing race having a concave inner wall, the inner wall of the outer bearing race and the outer surface of said inner bearing race defining a cavity therebetween, a flowable medium comprising freely movable shot within said cavity, and means preventing said shot from moving after said bearing unit and said shaft have been aligned and said shot has become self-arranged.

6. Apparatus as set forth in claim 5 wherein said outer bearing race has a groove which circumscribes the outer periphery thereof, and said outer race having spaced holes therein communicating said groove with said cavity.

7. Apparatus as set forth in claim 5 wherein said inner bearing race has upstanding side portions embracing side surfaces on the outer race for preventing shifting of said outer bearing race with respect to said inner bearing race in an axial direction.

8. Apparatus as set forth in claim 5 wherein said shaft has a carbide surface and said inner bearing race has a carbide surface.

9. Apparatus as set forth in claim 8 wherein the concave wall on said outer race is defined in part by tapered surfaces, the distance between said tapered surfaces of said outer bearing race and the outer surface of said inner bearing race is at all places equal to or greater than the diameter of said shot, and said distance being many times greater than the diameter of said shot at the center of said cavity, and means for preventing movement of said outer race with respect to said shaft when said shaft and said bearing unit are aligned.

References Cited

UNITED STATES PATENTS

| | | | |
|---|---|---|---|
| 3,255,510 | 6/1966 | Josephson et al. | 29—149.5 |
| 3,332,133 | 7/1967 | Rye | 29—149.5 |

THOMAS H. EAGER, *Primary Examiner.*